No. 764,103.

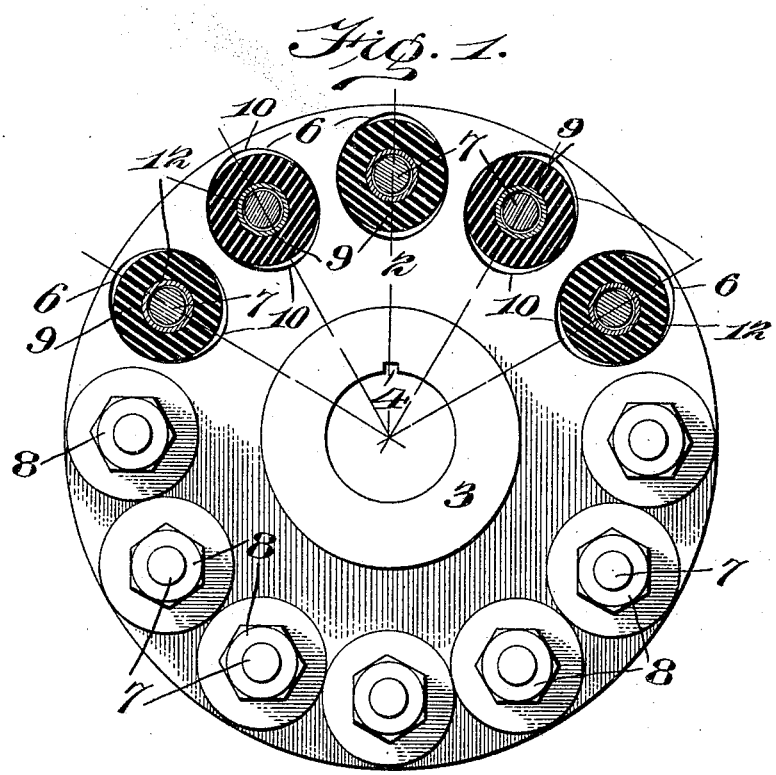
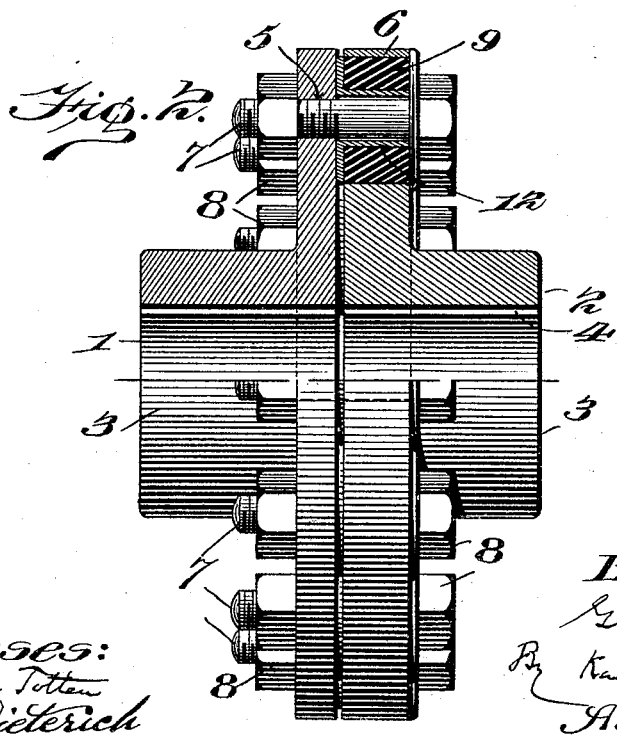

Patented July 5, 1904.

UNITED STATES PATENT OFFICE.

GEORGE BAEHR, OF McKEESPORT, PENNSYLVANIA, ASSIGNOR TO NATIONAL TUBE COMPANY, OF PITTSBURG, PENNSYLVANIA, A CORPORATION OF NEW JERSEY.

FLEXIBLE COUPLING.

SPECIFICATION forming part of Letters Patent No. 764,103, dated July 5, 1904.

Application filed June 6, 1903. Serial No. 160,392. (No model.)

*To all whom it may concern:*

Be it known that I, GEORGE BAEHR, a resident of McKeesport, in the county of Allegheny and State of Pennsylvania, have invented a new and useful Improvement in Flexible Couplings; and I do hereby declare the following to be a full, clear, and exact description thereof.

My invention relates to flexible couplings for shafts and the like; and its object is to provide a coupling of this character which is simple of construction, comparatively cheap, efficient in operation, and which can be readily put in place or permit the easy removal and replacement of either of the shaft-sections.

In many connections it is desirable to have two shaft-sections coupled together flexibly, in order that the vibration or motion of one section may not be communicated to the other. Such couplings are not, broadly, new; but all prior couplings, as far as I am aware, are expensive to make, rather complicated to put in place, and seriously interfere with the removal and replacement of either of the shaft-sections.

My invention is designed to produce a flexible coupling wherein the foregoing difficulties are overcome, and to this end it comprises two disks adapted for connection to the shaft-sections and provided with plain meeting faces, said disks having registering holes by means of which they are connected by bolts or the like, the holes in one of said disks being much larger than in the other and having soft compressible bushings, such as soft sponge-rubber, placed in said openings around the bolts.

The invention also comprises certain details of construction, such as making the enlarged holes elliptical with the long axes substantially in the line of the radius of the disks and also providing metallic bushings around the bolts to prevent wear of the rubber bushings.

In the accompanying drawings, Figure 1 is an end elevation of the coupling device, some of the securing-bolts being omitted the better to show the construction; and Fig. 2 is side view thereof, partly in section.

The coupling device comprises two disks 1 and 2, each of which is provided with a hub 3, adapted for attachment to the shaft-sections by any suitable arrangement, such as a key and slot 4. These disks are provided with registering openings 5 and 6, respectively, those in one of the disks, such as the openings 6, being much larger than those in the other disk. The holes 5 are screw-tapped, and the disks are united by threaded bolts 7, passing through the holes 5 and 6 and screwed into the latter and also secured by means of nuts 8. In each hole 6, surrounding the bolt 7, is a bushing 9, of soft compressible material, such as sponge-rubber or the like. Preferably the disk 2 will be much thicker than the disk 1, so as to provide wide bearings for these compressible bushings. It will be at once apparent that in the rotation of the coupling members this compressible material will yield, thus preventing the transmission of shocks from one shaft member to the other and also permitting one shaft member to take a slight annular position with reference to the other. In order to permit the rubber to yield the more readily, the openings 6 are not made quite circular, but are slightly elliptical, as shown in Fig. 1, the longer axis of said openings being approximately in radial lines of the disks. Consequently when the bushings are not under compression there will be slight openings or vacant spaces on opposite sides thereof, as indicated at 10, and when the pressure comes on the bushings they will squeeze into these openings, so that the latter afford a space into which the bushings may flow freely, thus rendering said bushings exceedingly elastic.

To prevent the bolts 7 from cutting into or rapidly wearing the soft compressible bushings, they are surrounded by metal sleeves or bushings 12, which are of slightly larger diameter than the bolts, but fit closely in the rubber bushings. These metal sleeves will practically take all the wear of the bolts.

My coupling member is very simple to make, as the holes 6 can be formed in casting the disk 2 and need not be machined out. The parts can all be readily assembled by reason of the plain meeting faces of the disks 1 and 2, and either of the shaft-sections can be removed and replaced without disturbing the other, it only being necessary to remove the securing-bolts 7, when either shaft-section can be taken out. The rubber bushings 9 are very elastic, and this elasticity is increased by reason of the non-circular shape of the holes in which they are placed. Said rubber bushings, however, are held in the holes 6 with sufficient friction, so that when the coupling member is removed they will not fall out and become displaced.

While I have shown all the large holes 6 in one of the disks and all the small holes 5 in the other disk, I wish it understood that the invention is not limited thereto, as the large and small holes may be alternately placed in opposite disks, although for cheapness and convenience in manufacture the arrangement shown in the drawings is preferred.

Instead of the bolts 7 it is obvious that rivets or other similar connecting members may be employed.

What I claim as my invention, and desire to secure by Letters Patent, is—

1. A shaft-coupling comprising two disks adapted for attachment to shaft-sections, said disks having flat meeting faces and being provided with registering holes, bolts passing through said holes and serving to secure said disks together, one hole of each pair being much larger than the bolt, and bushings of compressible material in said large holes surrounding the bolts.

2. A shaft-coupling comprising two disks adapted for attachment to shaft-sections, studs on one of said disks projecting into holes in the other disk, said holes being much larger than said studs, and bushings of soft sponge-rubber in said holes around said studs.

3. A shaft-coupling comprising two disks adapted for attachment to shaft-sections, said disks having flat meeting faces and being provided with registering holes, bolts passing through said holes and serving to connect said disks, one hole of each pair being non-circular and much larger than the bolt, and bushings of soft compressible material in said large holes around the bolts.

4. A shaft-coupling comprising two disks adapted for attachment to shaft-sections and being provided with registering holes, bolts passing through said holes and serving to connect said disks, one hole of each pair being much larger than the bolt and being elliptical in form with its axis substantially in the radial line of the disk, and sleeves of soft compressible material in said large holes around the bolts.

5. A shaft-coupling comprising two disks adapted for attachment to shaft-sections, one of said disks being provided with a series of holes, studs on the other disk and projecting into said holes and being much smaller than said holes, bushings of soft compressible material in said holes, and metal sleeves or bushings in said soft compressible bushing and surrounding said studs.

6. A shaft-coupling comprising two disks adapted for attachment to shaft-sections, said disks having flat meeting faces and being provided with registering holes, one of said disks being thicker than the other, bolts passing through said holes, the holes in the thicker disk being much larger than the bolts, and bushings of compressible material in said holes around said bolts.

In testimony whereof I, the said GEORGE BAEHR, have hereunto set my hand.

GEORGE BAEHR.

Witnesses:
J. A. CAUGHEY,
E. P. COREY.